1

2

3,558,673

10β-AMINO-19-NOR-PREGNANES AND METHOD FOR THE PREPARATION THEREOF

Pietro de Ruggieri, Carmelo Gandolfi, and Umberto Guzzi, Milan, Italy, assignors to Ormonoterapia Richter, S.p.A., Milan, Italy, a corporation of Italy No Drawing. Filed Oct. 23, 1967, Ser. No. 677,065
Claims priority, application Italy, Oct. 29, 1966, 29,420/66
Int. Cl. C07c *169/36*
U.S. Cl. 260—397.1 15 Claims

ABSTRACT OF THE DISCLOSURE

10β-amino-steroids of the pregnane series and a method for the preparation thereof.

Novel compounds of the present invention include the following:

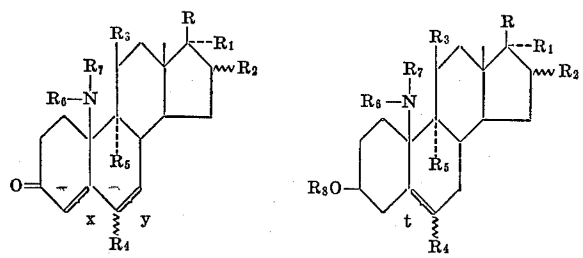

wherein:

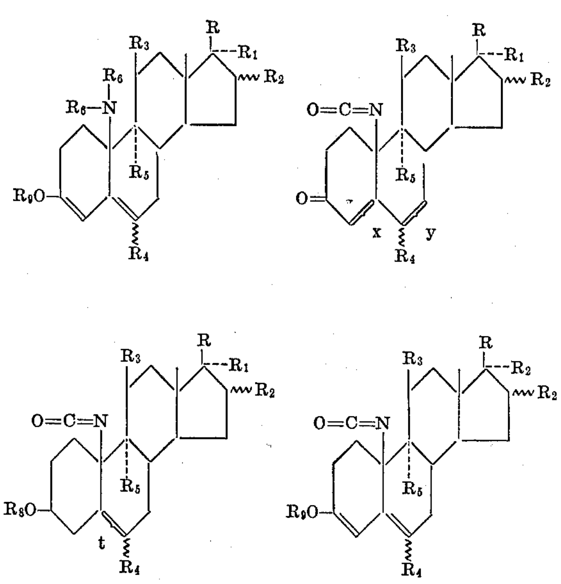

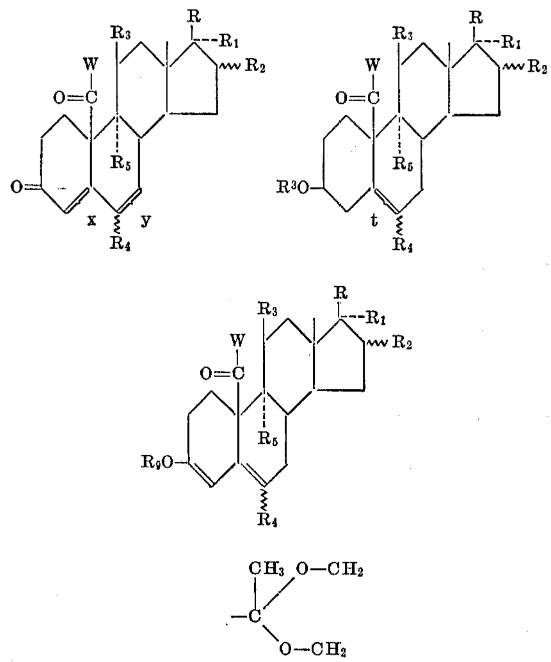

R is $-COCH_3$, $-COCH_2OH$, $-COCH_2O$ — pyranyl, or $COCH_2O$—acyl where the acyl group is derived from an aliphatic saturated carboxylic acid containing 1 to 10 carbon atoms or a dicarboxylic acid such as succinic or glutaric acid;
$R_1$ is hydrogen, hydroxy, 2′-tetrahydropyranyloxy or acyloxy where the acyl group is derived from an aliphatic saturated carboxylic acid containing 1 to 10 carbon atoms or a dicarboxylic acid such as succinic or glutaric acid;
R and $R_1$ together are 17, 20:20, 21-bismethylenedioxy;
$R_2$ is hydrogen or α- or β-methyl or hydroxy;
$R_3$ is hydrogen, α- or β-hydroxy or keto;
$R_4$ is hydrogen, methyl, chlorine or fluorine;
$R_5$ is hydrogen, chlorine or fluorine;
$R_6$ and $R_7$ are each hydrogen, methyl, acyl where the acyl group is derived from an aliphatic saturated carboxylic acid containing 1 to 10 carbon atoms, a cycloaliphatic acid such as cyclopentylacetic, cyclopentylpropionic or cyclohexylpropionic acid, a decarboxylic acid such as succinic, glutaric or methylsuccinic acid or an aromatic or arylaliphatic acid such as benzoic, salicylic, p-aminobenzoic, phenylpropionic or phenylacetic acid or $-COOR_{10}$ or $-CONHR_{10}$ where $R_{10}$ is methyl, ethyl, propyl, butyl, cyclohexyl, phenyl or phenylmethylene;
$R_8$ is hydrogen or acyl;
$R_9$ is methyl or ethyl;
W is chlorine, bromine, $-N_3$, $-NHOCOC_6H_5$, $NH_2$ or $-OCOR_{11}$ where $R_{11}$ is methyl, ethyl, propyl, butyl, cyclohexyl, phenyl or phenylmethylene;
*x*, *y* and *t* each represent a single or double bond;
≀ indicates here and throughout the specification that each of $R_2$ and $R_4$ may have α or β configuration and wherein C–5 has the α configuration when *t* represents a single bond and when both *x* and *y* represent a single bond.

The compounds of the present invention are endowed with progestative, cortical, hypophysial blocking, anesthetic, hypnotic and sedative activity and are prepared by two methods, for example, by starting with compounds of the following formula:

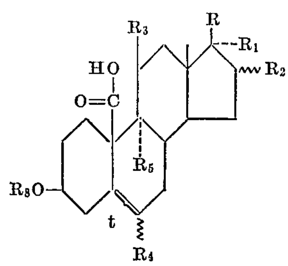

wherein:

R, $R_1$, $R_2$, $R_3$, $R_4$, $R_5$, $R_8$ and *t* have the same meaning set forth hereinbefore and wherein C–5 has the α configuration when *t* represents a single bond.

Starting with said compounds the synthesis proceeds according to the following reaction schemes:

SCHEME I

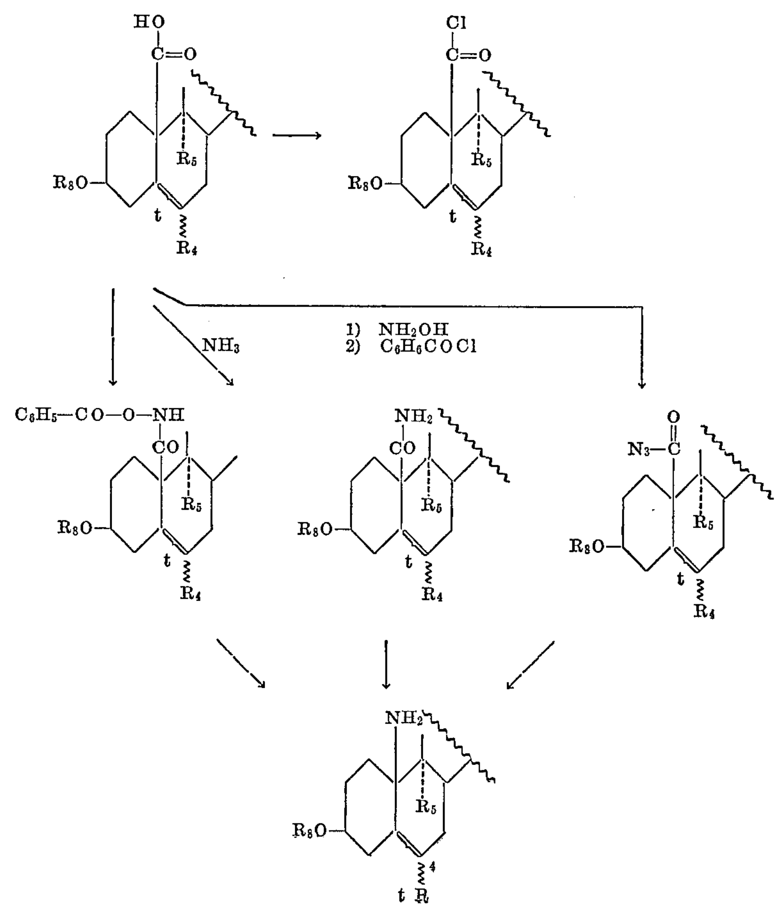

Reaction Scheme I illustrates the reaction of a 10β-carboxy compound or an alkali metal salt thereof (e.g. lithium, sodium or potassium such as thionyl chloride, oxalyl chloride, $PCl_5$ or $POCl_3$ in a solvent such as an ether (e.g., ethyl ether or isopropyl ether), benzene, toluene, hexane, dimethylformamide to form an acid chloride which, either raw or isolated, is allowed to react with an alkali metal azide ammonia or hydroxylamine to yield the corresponding 10β-carbonylazide, 10β-carbamoyl or 10β-hydroxaminic acid which is then benzoylated) intermediate which in a medium such as benzene, water, acid, hydrochloric acid, ether or mixtures thereof, undergoes rearrangement to yield 10β-amino steroids of the following formula:

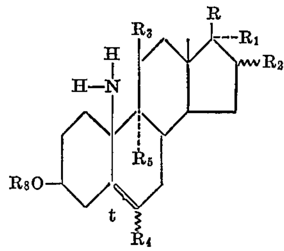

wherein R, $R_1$, $R_2$, $R_3$, $R_4$, $R_5$, $R_8$ and *t* have the same meaning set forth hereinbefore and wherein C–5 has the α configuration when *t* represents a single bond.

SCHEME II

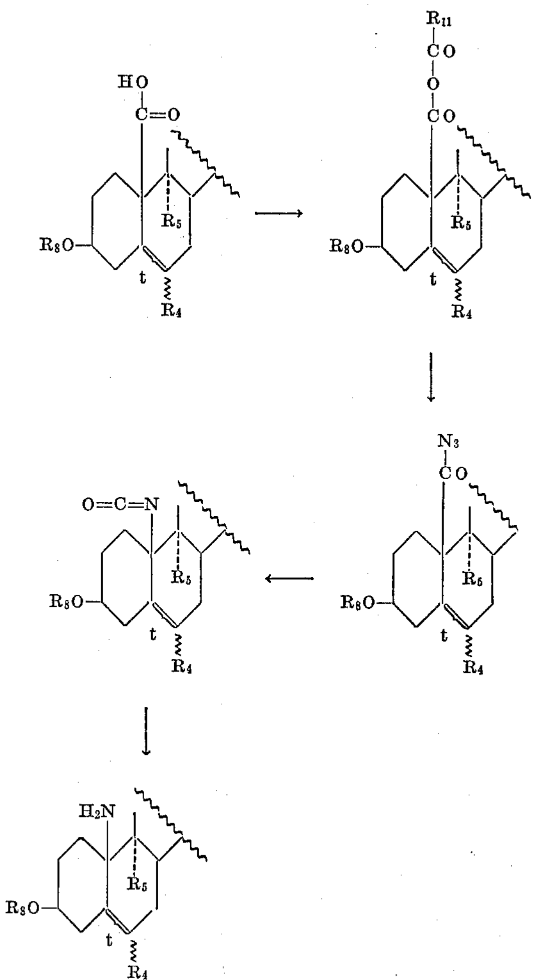

Reaction Scheme II wherein $R_{11}$ has the same meaning set forth hereinbefore illustrates the reaction of a 10β-carboxy compound with a chlorocarbonate such as ethyl chlorocarbonate or with another organic acid such as a carboxylic acid containing 1 to 4 carbon atoms in a solvent such as tetrahydrofurane, dioxane, benzene, toluene, dimethylformamide or acetone to form a mixed anhydride which, either raw or isolated, is allowed to react with an alkali ammonia (not shown) or hydroxyamine and then benzoyl chloride (not shown) metal azide to yield the corresponding intermediate which by heating in a medium such as benzene, toluene or ethyl ether, undergoes re-arrangement to give the 10β-isocyanato-19-nor-derivatives.

These latter compounds, in a medium such as hydrochloric acid, sulfuric acid, acetic acid, water, ether or mixtures thereof, are converted to 10β-amino-19-nor-steroids of the formula:

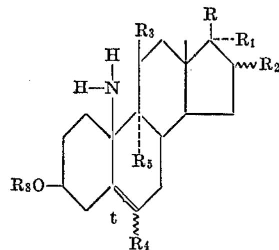

wherein R, $R_1$, $R_2$, $R_3$, $R_4$, $R_5$, $R_8$ and *t* have the same meaning set forth hereinbefore and wherein C–5 has the α configuration when *t* represents a single bond.

By starting with 10β-amino steroids obtained by the reaction schemes above or with 10β-amino compounds obtained therefrom and wherein $R_8$ is hydrogen or formate, compounds of the following formula are obtained by Oppenauer reaction:

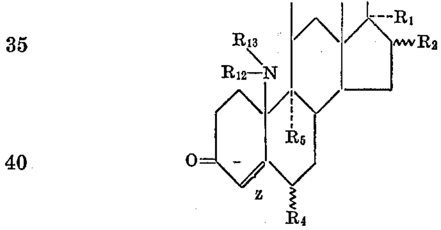

Reaction Scheme IV illustrates the formation of mixed before, *z* represents a single or double bond, C–5 has the α configuration when *z* represents a single bond and wherein each of $R_{12}$ and $R_{13}$ is hydrogen or methyl.

The same compounds are obtained when starting with compounds of the following formula

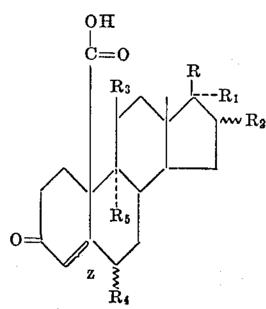

wherein R, $R_1$, $R_2$, $R_3$, $R_4$, $R_5$ and *z* have the same meaning set forth hereinbefore and wherein C–5 has the α configuration when *z* represents a single bond.

SCHEME III

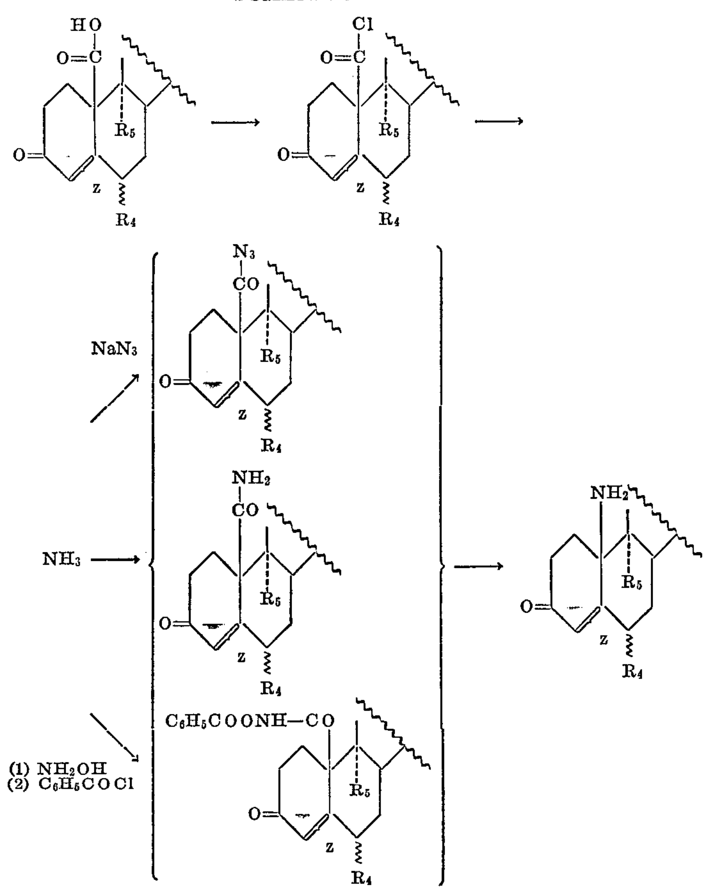

Reaction Scheme III illustrates the acid chloride formation, its conversion to, for example, azide and the rearrangement to 10β-amino-steroid.

The same products are prepared also by another synthesis according to Scheme IV.

SCHEME IV

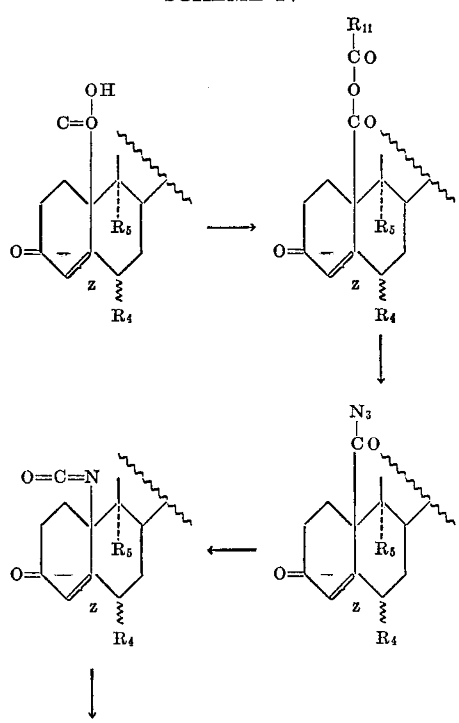

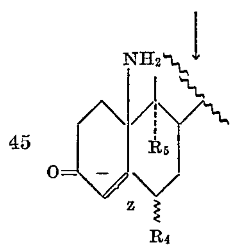

Reaction Scheme IV illustrates the formation of mixed 10β-carboxy-anhydride, its conversion to, for example, 10β-carbonylazide and finally the rearrangement to 10β-isocyanate and then the conversion of these latter compounds to 10β-amino-steroids.

The reaction of 10β-amino-steroids of the following formula:

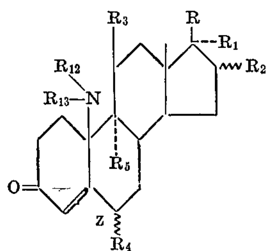

wherein R, $R_1$, $R_2$, $R_3$, $R_4$, $R_5$, $R_{12}$, $R_{13}$ and $z$ have the same meaning set forth hereinafter and wherein C–5 has the α configuration when $z$ represents a single bond.

With alcohols such as anhydrous methanol or ethanol in a solvent such as dioxane, tetrahydrofurane, methanol, ethyl orthoformate, or methyl orthoformate and mixtures thereof in the presence of an acid such as gaseous hydrochloric acid, p-toluenesulfonic acid, sulfuric acid, trichloroacetic acid, trifluoroacetic acid, allows the preparation of compounds of the formula:

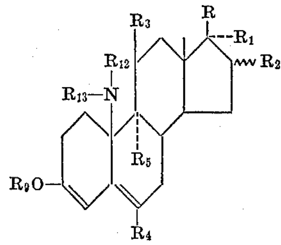

wherein R, $R_1$, $R_2$, $R_3$, $R_4$, $R_5$, $R_9$, $R_{12}$ and $R_{13}$ have the same meaning as set forth hereinbefore.

The above described 3-enol-ethers are reacted with 2,3-dicyan-5,6-dichlor-benzoquinone in a solvent such as benzene, dioxane, acetone, water on mixtures thereof to obtain, according to the following reaction screme;

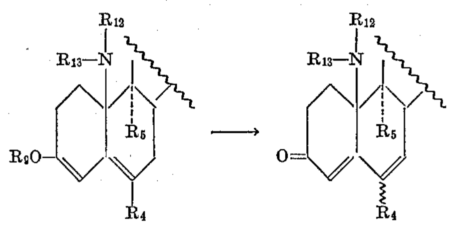

the corresponding 10β-amino-estra-4,6-diene-3-ones of the following formula:

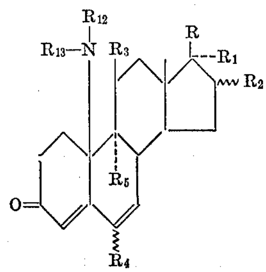

wherein R, $R_1$, $R_2$, $R_3$, $R_4$, $R_5$, $R_9$, $R_{12}$ and $R_{13}$ have the same meaning set forth hereinbefore.

The following non-limitative examples illustrate the invention.

EXAMPLE 1

10β-amino-19-nor-pregn-5-ene-20-one-3β-hydroxy-3-acetate 10.2 parts of 10β-carboxy-19-nor-pregnenolone-3-acetate dissolved in 2,000 parts of anhydrous benzene were added to 30 parts of freshly distilled thionyl chloride and the mixture was kept boiling for two and one half hours. After evaporation to dryness, the thionyl chloride was removed by successive distillations in benzene, while evaporating each time to dryness to obtain finally 10β-chloroformyl-19-nor-pregnenolene - 3 - acetate which was dissolved in 300 parts acetone to which 10 g. of sodium azide was added. The system was kept under stirring for 3 hours, then it was concentrated to a small volume while keeping the temperature below 25° C. It was then diluted with water but the product did not crystallize. Therefore, the product was extracted with ethyl ether. After dehydrating on sodium sulfate, the residue was evaporated to dryness to obtain 10 g. of 10β-carbonylazide-19-nor-pregnenolene-3-acetate which was suspended in toluene and left on a water bath for 1.3 hours. During this time, the release of nitrogen in small bubbles occurred. The mixture was concentrated to dryness and 10β-iscyanato-19-nor-pregn-5-ene-20-one-3-acetate was obtained which was suspended in 100 parts of 50% acetic acid and left on a water bath for 2 hours. The mixture was concentrated under vacuum to dryness and combined with water, then extracted with ethyl acetate and washed twice with sodium bicarbonate and then with salt water until neutral.

The mixture was dehydrated on sodium sulfate and evaporated to dryness. The product crystallized from methanol to yield 6.350 parts of 10β-amino-19-nor-pregn-5-ene-20-one-3-acetate; M.P. 140°–142° C., $\alpha_D=13°$ ($CHCl_3$).

EXAMPLE 2

10β-amino-19-nor-pregn-5-ene-20-one-3β-hydroxy 0.73 part of 10β-amino-19-nor-pregn-5-ene-20-3-acetate were dissolved in 15 parts methanol and 0.173 part potassium carbonate dissolved in 3.65 parts water were added thereto (the reaction is carried out in inert gas atmosphere). After refluxing for 45 minutes, the mixture was evaporated to dryness and taken again with methylene chloride, then washed with a saturated water solution of salt until neutral and then washed once with a little distilled water.

The organic layer was dehydrated with sodium sulfate and evaporated to dryness to obtain 0.630 part of 10β-amino-19-nor-pregn-5-ene-20-one-3β-hydroxy; M.P. 169°–170° C.

EXAMPLE 3

10β-amino-19-nor-progesterone 0.630 part of 10β-amino-19-nor-pregn-5-ene-20-one-3β-hydroxy were dissolved in 40 parts anhydrous toluene and 6.4 parts cyclohexanone.

The mixture was kept under nitrogen flow for 30 minutes where 15 parts solvent are distilled, then 0.6 part aluminum isopropylate dissolved in 6 parts anhydrous toluene were added within 10 minutes.

The system was allowed to reflux for 5 hours, always under nitrogen flow, then it was cooled and 20 parts of saturated solution of Seignette salt are slowly added always stirring. Both phases were separated and the aqueous layer was washed with benzene. The organic layers were combined and distilled under steam stream. After extraction with ethyl acetate, the product was dehydrated on sodium sulfate and evaporated to dryness. The product crystallized from ethyl acetate to yield 0.22 part of 10β-amino - 19 - nor - progesterone; M.P. 151°–153° C.; $\alpha_D=+206$ $CHCl_3$ $\lambda_{max}=235$ mμ, $\epsilon=14.700$.

EXAMPLE 4

10β-carbomethoxyamino-10-nor-pregn-5-ene-20-one-3-acetate 0.7 part of 10β-isocyanato-10-nor-pregn-5-ene-20-one-3-acetate were dissolved in 25 ml. methanol and allowed to reflux for 4 hours, then evaporated to dryness.

I.R. spectrum showed that the isocyanate band had disappeared at 2,220 cm.$^{-1}$ that the methane band had appeared. The resulting product was 10β-carbamate-19-nor-pregn-5-ene-20-one-3-acetate, M.P. 182–184° C.

EXAMPLE 5

10β-3′-methylurea-10-nor-pregn-5-ene-20-one-3-acetate 0.5 part of 10β-isocyanato-10-nor-pregn-5-ene-20-one-3-acetate and methylamino were dissolved in 30 ml. toluene and placed in a vial. The system was cooled to −10° C. and the vial was closed. The vial was kept to 30° C. overnight, then cooled again at −10° C. and the vial was opened, the mixture evaporated to dryness, extracted with methylene chloride, and washed with water. The organic layer was dehydrated on sodium sulfate, filtered and evaporated to dryness. The raw product crystallized from methanol to yield 0.165 part of 10β-3′-methylurea-19-nor-pregn-5-ene-20-one-3-acetate; M.P. 213°–216° C.

EXAMPLE 6

10β-amino-3-ethoxy-19-nor-pregn-3,5-diene-20-one 0.315 part of 10β-amino-19-nor-progesterone were dehydrated in benzene and dissolved in 2.5 parts anhydrous dioxane, then 0.40 part (dehydrated) p-toluene-sulfonic acid were added thereto. When the whole was solubilized, 0.5 part freshly distilled triethylorthoformate were added thereto as well as 0.3 part of a solution of the following composition:

0.244 part p-toluene-sulfonic acid
2.7 parts anhydrous dioxane
0.55 part absolute ethanol The reaction material was kept at room temperature for 15 hours, then 15 parts water containing 0.7 part sodium bicarbonate were added. After evaporating to dryness, the product was extracted repeatedly with methylene chloride. It was washed with water, the washing water was extracted again and the dehydrated organic phase was evaporated to dryness.

The product crystallized from ethylether to afford 0.260 part of 10β-amino-3-ethoxy-19-nor-pregn-3,5-diene-20-one; M.P. 191–193° C., $\lambda_{max}$241; ε=20,700, I.R.=1740 cm.$^{-1}$ (ketone), 1655 cm.$^{-1}$ and 1628 cm.$^{-1}$.

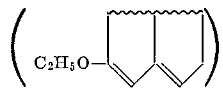

EXAMPLE 7

10β-amino-3N-pyrrolidyl-19-nor-pregn-3,5-diene-20-one 0.315 part of 10β-amino-19-nor-progesterone were refluxed in 15 parts benzene in the presence of a device for water removal. After 15 minutes, 0.30 part p-toluenesulfonic acid were added. After about half an hour, 15 parts pyrrolidine were added. After 12 hours, the mixture was cooled and washed with potassium carbonate cold solution and then with water the mixture was dehydrated on sodium sulfate and evaporated to dryness. 0.3 part of raw product were obtained which after chromatography on alkaline alumina, yielded 0.21 part of 10β-animo-3N-pyrrolidyl-19-nor-pregn-3,5-dien-20-one; $\lambda_{max}$ 275 m/μ; ε=12,820; M.P. 175°–178° C.

EXAMPLE 8

10β-propionamide-19-nor-pregn-5-ene-20-one-3-acetate 0.25 part of 10β-amino-19-nor-pregn-5-ene-20-one-3-acetate were dissolved in 6 parts pyridine and treated with 2 parts propionic anhydride. The mixture was left overnight at room temperature, then diluted with water, extracted with ethylether and washed with water-sodium bicarbonate and water until neutral. The product was dehydrated on sodium sulfate and evaporated to dryness. The product crystallized from methanol to yield 0.17 part of 10β-propionamido-19-nor-pregn-5-ene-20-one-3-acetate; M.P. 121°–123° C.

EXAMPLE 9

10β-dimethylamino-19-nor-pregn-5-ene-20-one-3-acetate

In 9 parts of formic acid under stirring, 3 parts of 10β-amino-19-nor-pregn-5-ene-20-one-3-acetate were introduced, then 3 parts formic aldehyde (40% Formalin) were added. After 15 minutes stirring at temperature below 10° C., the mixture was refluxed for 6 hours. During the reaction, a further 3 parts Formalin were added. Then the mixture was cooled and 30 parts water and 5 parts concentrated hydrochloric acid were added. The solution was alkalinized while keeping the temperature between 10° and 15° C. The mixture was then extracted three times with chloroform. The organic phases were combined and washed with water to neutral, then dehydrated on $Na_2SO_4$, whereafter the solvent was distilled under vacuum. The product crystallized from ethyl ether to afford 1.4 parts of 10β-dimethylamino-19-nor-pregn-5-ene-20-one-3-acetate; M.P. 117°–122° C.

EXAMPLE 10

10β-dimethylamino-19-nor-pregn-5-ene-20-one-3β-hydroxy 1.4 parts of 10β-dimethylamino-19-nor-pregn-5-ene-20-one-3-acetate were dissolved in 60 parts methanol and 0.25 part potassium carbonate dissolved in 5 parts water were added (by carrying out the reaction under inert gas). The mixture was refluxed for 45 minutes, evaporated to dryness and extracted with methylene chloride and washed with water until neutral. The organic layer was dehydrated with $Na_2SO_4$ and evaporated to dryness to obtain 1.2 parts of 10β-dimethylamino-19-nor-pregn-5-ene-20-one-3β-hydroxy (disappearance of I.R. bands at 1,250 cm.$^{-1}$ and 1,730 cm.$^{-1}$) which was employed in a further reaction without further purification.

EXAMPLE 11

10β-dimethylamino-19-nor-progesterone 1.2 parts of 10β-dimethylamino-19-nor-pregn-5-ene-20-one-3β-hydroxy were dissolved in 50 parts anhydrous toluene and 6.5 parts cyclohexanone. While kept in a nitrogen stream for 30 minutes, 15 parts solvent were distilled, then 0.9 part aluminum isopropylate dissolved in 9 parts anhydrous toluene were added within 10 minutes. The system was refluxed for 5 hours always under inert gas, then it was cooled and while continually stirring 30 parts Seignette salt saturated solution were slowly added. Both phases were separated and the aqueous layer was washed with benzene. The organic layers were combined and steam distilled. The product extracted wtih ethyl ether, dehydrated on $Na_2SO_4$ and evaporated to dryness. The product crystallized from ethyl ether to yield 0.5 part of 10β-dimethylamino-19-nor-progesterone; M.P. 128°–131° C.; $\lambda_{max}$ 236 mμ; ε=14,650.

EXAMPLE 12

19β-carbonylazide-pregn-4-ene-3,20-dione 10 parts of 10β-carboxy-19-nor-progesterone were dissolved in 1,270 parts distilled acetone, then 5.9 parts of water were added. At 0° C., 84.2 parts of solution of the following composition were added:

11.4 parts triethylamine in 100 parts acetone as well as 84.2 parts of a solution formed of 8.6 parts ethylchlorocarbonate in 100 parts acetone. The mixture was stirred for 30 minutes while the temperature was kept at 0° C. Within 15 minutes, a solution of 2.73 parts sodium azide in 21 parts water was added dropwise. The mixture was stirred for one hour in an ice-water bath. 100 parts water were added. The product does not crystallize, therefore, it was extracted with ethyl ether and washed until neutral with a little water. It was then dehydrated and evaporated to dryness without exceeding 25° C. to obtain 6.2 parts of 10β-carbonylazide-19-nor-pregn-4-ene-3,20-dione, I.R. 2,120 cm.$^{-1}$. Extraction alkaline waters were acidified and extracted with methylene chloride and the extract was washed with salt saturated water and evaporated to dryness to obtain 3.8 parts of 10β-carbonylazide-19-nor-pregn-4-ene-3,20-dione, which was recovered and further employed.

Example 13

10β-isocyanato-19-nor-pregn-4-ene-3,20-dione 6 parts of 10β-carbonylazide-19-nor-pregn-4-ene-3,20-dione in 100 parts toluene were heated on a water bath. After bubbling ceases, the mixture was heated for another half-hour and evaporated to dryness to obtain 5.8 parts of 10β - isocyanato - 19-nor-pregn-4-ene-3,20-dione. The product was slaked in ethyl ether to yield 5 parts of 10β-isocyanato - 19 - nor-pregn-4-ene-3,20-dione; M.P. 106°–108° C.; $\alpha_D(CHCl_3)$=−270°; I.R.=2,210 cm.$^{-1}$ (—N=C=O)

EXAMPLE 14

10β-amino-19-nor-pregn-4-ene-3,20-dione 3 parts of 10β-isocyanato-19-nor-pregn-4-ene-3,20-dione weer suspended in 30 parts 50% acetic acid and left on a water bath for two hours. The mixture was evaporated under vacuum until dry and extracted with water, extracted with ethyl acetate and washed twice with sodium bicarbonate and then with salt water until neutral. The mixture was dehydrated on sodium sulfate and evaporated to dryness. The product crystallized from methanol to yield 2.75 parts of 10β-amino-19-nor-pregn-4-ene-3,20-dione; M.P. 152°–155° C.; $\alpha_D$=+205° ($CHCl_3$); $\lambda_{max}$ 235 mμ, ε=15,000.

EXAMPLE 15

10β-carbomethoxyamino-10-nor-pregn-4-ene-3,20-dione 1.5 parts of 10β-isoyanato-10-nor-pregn-4-ene-3,20-dione were suspended in 30 parts methanol for 3 hours, then evaporated to dryness to obtain 1.5 parts of a raw product which did not show under I.R. spectrum analysis the isocyanate band, whereas it did show the carbamate band. The product crystallized from ethyl ether to give 1.1 parts of 10β-urethane-19-nor-pregn-4-ene-3,20 dione; M.P. 172°–174° C.; $\alpha_D$=225° ($CHCl_3$).

EXAMPLE 16

10β-propionamido-19-nor-pregn-4-ene-3,20-dione 1.5 parts of 10β-amino-19-nor-pregn-4-ene-3,20-dione were dissolved in 6 parts pyridine and 3 parts propionic anhydride were added thereto. The mixture was left overnight at room temperature, diluted with water, extracted with ethyl ether, washed with water, washed twice with sodium bicarbonate 6% solution and then with water to neutral. The product was dehydrated on $Na_2SO_4$ and evaporated to dryness. The obtained product was crystallized from ethyl acetate to yield 1.07 parts of 10β-propionamide-19-nor-pregn-4-ene-3,20-dione; M.P. 175°–176° C.; $\alpha_D$=108° ($CHCl_3$), $\lambda_{max}$ 248 mμ; ε=11,540.

We claim:

1. A compound of the formula

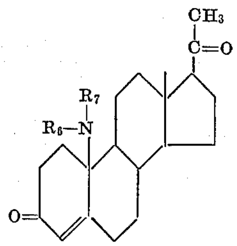

wherein $R_6$ and $R_7$ are each H, lower alkyl, alkanoyl of 1 to 10 carbon atoms, cyclopentylacetyl, cyclopentylpropionyl, cyclohexylpropionyl, succinyl, glutaryl, methylsuccinyl, benzoyl, salicylyl, p-aminobenzoyl, phenylpropionyl, phenylacetyl or $COOR_{10}$ or $CONHR_{10}$ where $R_{10}$ is methyl, ethyl, propyl, butyl, cyclohexyl, phenyl or phenylmethylene, or $R_6$ and $R_7$ together form the group =C=O.

2. The compound of claim 1 wherein $R_6$ and $R_7$ are each hydrogen, methyl, alkanoyl of 1 to 10 carbon atoms or $COOR_{10}$ or $CONHR_{10}$ where $R_{10}$ is methyl, ethyl, propyl or butyl.

3. A compound of the formula

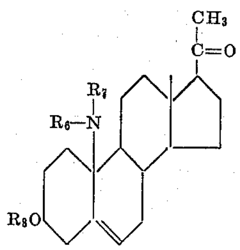

wherein $R_6$ and $R_7$ are each H, lower alkyl, alkanoyl of 1 to 10 carbon atoms, cyclopentylacetyl, cyclopentylpropionyl, cyclohexylpropionyl, succinyl, glutaryl, methylsuccinyl, benzoyl, salicylyl, p-aminobenzoyl, phenylpropionyl, phenylacetyl, or $COOR_{10}$ or $CONHR_{10}$ where $R_{10}$ is methyl, ethyl, propyl, butyl, cyclohexyl, phenyl or phenylmethylene, or $R_6$ and $R_7$ together form the group =C=O; and $R_8$ is H or lower alkanoyl.

4. The compound of claim 3 wherein $R_6$ and $R_7$ are each hydrogen, methyl, alkanoyl of 1 to 10 carbon atoms or $COOR_{10}$ or $CONHR_{10}$ where $R_{10}$ is methyl, ethyl, propyl or butyl; $R_8$ is hydrogen or acetyl.

5. A compound of the formula

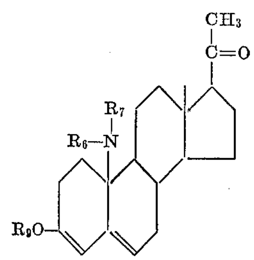

wherein $R_6$ and $R_7$ are each H, lower alkyl, alkanoyl of 1–10 carbon atoms, cyclopentylacetyl, cyclopentylpropionyl, cyclohexylpropionyl, succinyl, glutaryl, methylsuccinyl, benzoyl, salicylyl, p-aminobenzoyl, phenylpropionyl, phenylacetyl, or $COOR_{10}$ or $CONHR_{10}$ where $R_{10}$ is methyl, ethyl, propyl, butyl, cyclohexyl, phenyl or phenylmethylene; and $R_9$ is methyl or ethyl.

6. The compound of claim 5 wherein $R_6$ and $R_7$ are each hydrogen, methyl, 1 to 10 carbon atoms or $COOR_{10}$ or $CONHR_{10}$ where $R_{10}$ is methyl, ethyl, propyl or butyl.

7. A compound of the formula

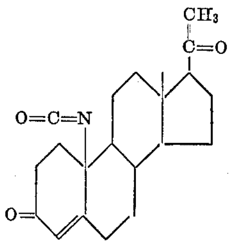

8. A compound of the formula

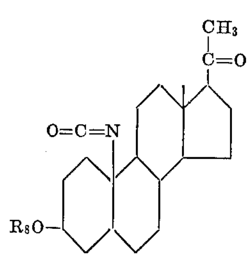

wherein $R_8$ is hydrogen or lower alkanoyl.

9. The compound of claim 8 wherein $R_8$ is H or acetyl.

10. A compound of the formula

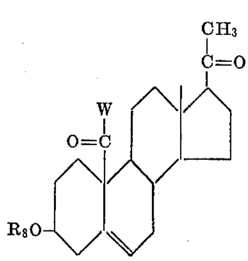

wherein $R_8$ is hydrogen or lower alkanoyl and W is chlorine, bromine, $—N_3$, NHOCO $C_6H_5$, $NH_2$, $—OCOR_{11}$ where $R_{11}$ is methyl, ethyl, propyl, butyl, cyclohexyl, phenyl or phenylmethylene or $OCOOR_{12}$ wherein $R_{12}$ is lower alkyl.

11. The compound of claim 10 wherein $R_8$ is hydrogen or acetyl and W is chlorine, $—N_3$, NHOCO $C_6H_5$, $NH_2$ or $—OCOR_{11}$ where $R_{11}$ is methyl, ethyl, propyl or butyl.

12. A process for the preparation of a 10β-amino compound of the formula:

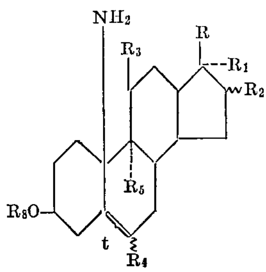

wherein:

R is $—COCH_3$, $—COCH_2OH$, $—COCH_2O$-pyranyl,

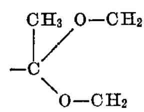

or $—COCH_2O$-acyl where the acyl group is derived from an aliphatic saturated carboxylic acid containing 1 to 10 carbon atoms, succinic acid or glutaric acid;
$R_1$ is hydrogen, hydroxy, 2'-tetrahydropyranyloxy or acyloxy where the acyl group is derived from an aliphatic saturated carboxylic acid containing 1 to 10 carbon atoms, succinic acid or glutaric acid;
R and $R_1$ together are 17,20:20,21-bismethylenedioxy;
$R_2$ is hydrogen, α- or β-methyl or α- or β-hydroxy;
$R_3$ is hydrogen, α- or β-hydroxy to keto;
$R_4$ is hydrogen, methyl, chlorine or fluorine;
$R_5$ is hydrogen, chlorine or fluorine;
$R_8$ is hydrogen or acyl where the acyl group is derived from an aliphatic saturated carboxylic acid; and
*t* represents a single or double bond and wherein C–5 has the α configuration when *t* represents a single bond, comprising reacting a compound of the formula:

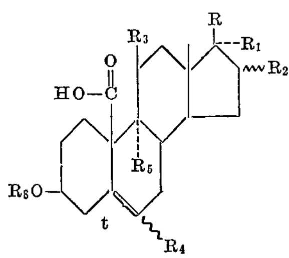

or an alkali metal salt thereof wherein R, $R_1$, $R_2$, $R_3$, $R_4$, $R_5$, $R_8$ and *t* are as defined with respect to said 10β-amino compound and wherein C–5 has the α configuration when *t* represents a single bond with thionyl chloride, oxalyl chloride, $PCl_5$ or $POCl_3$ in a solvent selected from the group consisting of benzene, ether, hexane and dimethylformamide, reacting the resulting product with an alkali metal azide, ammonia or hydroxylamine and benzoyl chloride and placing the resulting product in a medium selected from the group consisting of benzene, water, acetic acid, hydrochloric acid, ether and mixtures thereof to form said 10β-amino compound.

13. A process for the preparation of a 10β-amino compound of the formula:

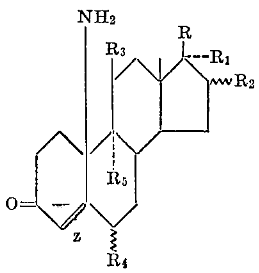

wherein:
R is $—COCH_3$, $—COCH_2OH$, $—COCH_2O$-pyranyl,

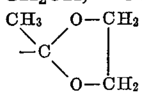

or $—COCH_2D$-acyl where the acyl group is derived from an aliphatic saturated carboxylic acid containing 1 to 10 carbon atoms, succinic acid or glutaric acid;
$R_1$ is hydrogen, hydroxy, 2'-tetrahydropyranyloxy or acyloxy where the acyl group is derived from an aliphatic saturated carboxylic acid containing 1 to 10 carbon atoms, succinic acid or glutaric acid;
R and $R_1$ together are 17,20:20,21-bismethylenedioxy;
$R_2$ is hydrogen, α- or β-methyl or α- or β-hydroxy;
$R_3$ is hydrogen, α- or β- hydroxy or keto;
$R_4$ is hydrogen, methyl, chlorine or fluorine;
$R_5$ is hydrogen, chlorine or fluorine; and
*z* represents a single or double bond and wherein C–5 has the α configuration when *z* represents a single bond, comprising reacting acompound of the formula:

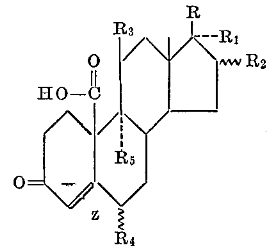

or an alkali metal salt thereof wherein R, $R_1$, $R_2$, $R_3$, $R_4$, $R_5$ and *z* are as defined with respect to said 10β-mino compound and wherein C–5 has the α-configuration when *z* represents a single bond with thionyl chloride, oxalyl chloride, $PCl_5$ or $POCl_3$ in a solvent selected from the group consisting of benzene, ether, hexane and dimethylformamide, reacting the resulting product with an alkali metal azide, ammonia or hydroxylamine and benzoyl chloride and placing the resulting product in a medium selected from the group consisting of benzene, water, acetic acid, hydrochloric acid, ether and mixtures thereof to form said 10β-amino compound.

14. A process for the preparation of a 10β-amino compound of the formula:

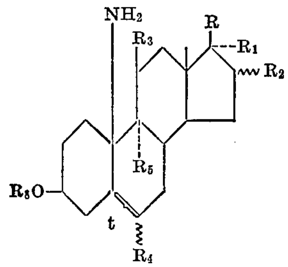

wherein:
R is $—COCH_3$, $—COCH_2OH$, $—COCH_2O$-pyranyl,

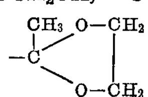

or —$COCH_2O$-acyl where the acyl group is derived from an aliphatic saturated carboxylic acid containing 1 to 10 carbon atoms, succinic acid or glutaric acid;

$R_1$ is hydrogen, hydroxy, 2′-tetrahydropyranyloxy or acyloxy where the acyl group is derived from an aliphatic saturated carboxylic acid containing 1 to 10 carbon atoms, succinic acid or glutaric acid;

R and $R_1$ together are 17,20:20,21-bismethylenedioxy;

$R_2$ is hydrogen, $\alpha$- or $\beta$-methyl or $\alpha$- or $\beta$-hydroxy;

$R_3$ is hydrogen, $\alpha$- or $\beta$- hydroxy or keto;

$R_4$ is hydrogen, methyl, chlorine or fluorine;

$R_5$ is hydrogen, chlorine or fluorine;

$R_8$ is hydrogen or acyl where the acyl group is derived from an aliphatic saturated carboxylic acid; and

*t* represents a single or double bond and wherein C–5 has the $\alpha$ configuration when *t* represents a single bond, comprising reacting a compound of the formula:

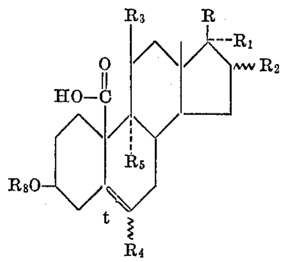

wherein R, $R_1$, $R_2$, $R_3$, $R_4$, $R_5$, $R_8$ and *t* are as defined with respect to said 10$\beta$-amino compound and wherein C–5 has the $\alpha$ configuration when *t* represents a single bond with ethyl chlorocarbonate or an acid of the formula $R_{11}COOCH$ wherein $R_{11}$ is methyl, ethyl, propyl, butyl, cyclohexyl, phenyl or phenylmethylene in a solvent selected from the group consisting of acetone, tetrahydrofurane, dioxane, benzene or dimethylformamide to form a 10$\beta$-carboxyanhydride compound of the formula:

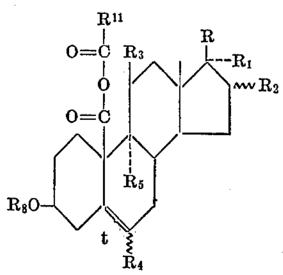

whrein R, $R_1$, $R_2$, $R_3$, $R_4$, $R_5$, $R_8$ and *t* are as defined with respect to said 10$\beta$-amino compound, $R_{11}$ is methyl, ethyl, propyl, butyl, cyclohexyl, phenyl or phenylmethylene and wherein C–5 has the $\alpha$ configuration when *t* represents a single bond, reacting said 10$\beta$-carboxyanhydride compound with an alkali metal azide, ammonia or hydroxylamine and benzoyl chloride and placing the resulting product in a medium selected from the group consisting of benzene, toluene and ether to form a 10$\beta$-isocyanato compound of the formula:

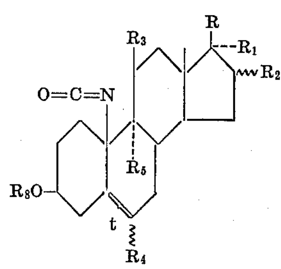

wherein R, $R_1$, $R_2$, $R_3$, $R_4$, $R_5$, $R_8$ and *t* are as defined with respect to said 10$\beta$-amino compound and wherein C–5 has the $\alpha$ configuration when *t* represents a single bond and placing said 10$\beta$-isocyanato compound in a medium selected from the group consisting of water, acetic acid, hydrochloric acid, ether and mixtures thereof to form said 10$\beta$-amino compound.

15. A process for the preparation of a 10$\beta$-amino compound of the formula:

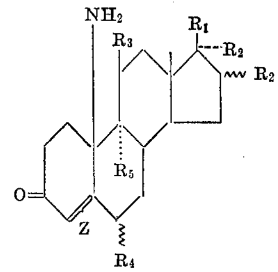

wherein:

R is —$COCH_3$, —$COCH_2OH$, —$COCH_2O$-pyranyl, $$-\overset{CH_3}{\underset{}{C}}\!<\!\begin{matrix}O-CH_2\\ O-CH_2\end{matrix}$$

or —$COCH_2O$-acyl where the acyl group is derived from an aliphatic saturated carboxylic acid containing 1 to 10 carbon atoms, succinic acid or glutaric acid;

$R_1$ is hydrogen, hydroxy, 2′-tetrahydropyranyloxy or acyloxy where the acyl group is derived from an aliphatic saturated carboxylic acid containing 1 to 10 carbon atoms, succinic acid or glutaric acid;

R and $R_1$ together are 17,20:20,21-bismethylenedioxy;

$R_2$ is hydrogen, $\alpha$ or $\beta$-methyl or $\alpha$- or $\beta$-hydroxy;

$R_3$ is hydrogen, $\alpha$- or $\beta$-hydroxy or keto;

$R_4$ is hydrogen, methyl, chlorine or fluorine;

$R_5$ is hydrogen, chlorine or fluorine; and

*z* represents a single or double bond and wherein C–5 has the $\alpha$ configuration when *z* represents a single bond, comprising reacting a compound of the formula:

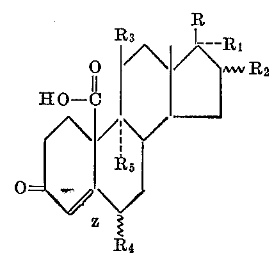

wherein R, $R_1$, $R_2$, $R_3$, $R_4$, $R_5$, and z are as defined with respect to said 10$\beta$-amino compound and wherein C–5 has the $\alpha$ configuration when z represents a single bond with ethyl chlorocarbonate or an acid of the formula $R_{11}COOH$ wherein $R_{11}$ is methyl, ethyl, propyl, butyl, cyclohexyl, phenyl or phenylmethylene in a solvent selected from the group consisting of acetone, tetrahydrofuran, dioxane, benzene or dimethylformamide to form a 10$\beta$-carboxyanhydride compound of the formula:

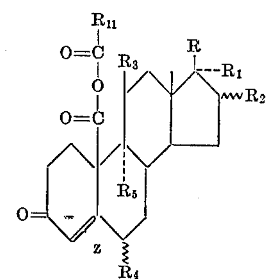

wherein R, $R_1$, $R_2$, $R_3$, $R_4$, $R_5$ and z are as defined with respect to said 10$\beta$-amino compound, $R_{11}$ is methyl, ethyl, propyl, butyl, cyclohexyl, phenyl or phenylmethylene and wherein C–5 has the $\alpha$ configuration when z represents a single bond, reacting said 10$\beta$-carboxyanhydride compound with an alkali metal azide, ammonia or hydroxylamine and benzoyl chloride and placing the resulting product in a medium selected from the group consisting of benzene, toluene and ether to form a 10β-isocyanato compound of the formula:

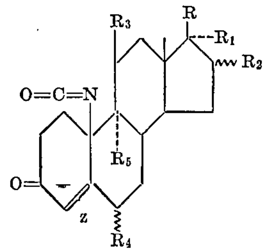

wherein R, $R_1$, $R_2$, $R_3$, $R_4$, $R_5$ and z are as defined with respect to said 10β-amino compound and wherein C–5 has the α configuration when z represents a single bond and placing said 10β-isocyanato compound in a medium selected from the group consisting of water, acetic acid, hydrochloric acid, ether and mixtures thereof to form said 10β-amino compound.

References Cited

UNITED STATES PATENTS 3,275,621 9/1966 Bowers ---------- 260—239.55

ELBERT L. ROBERTS, Primary Examiner

U.S. Cl. X.R.

260—239.55; 397.3; 397.4; 397.45; 397.47; 349